(12) United States Patent
Suzuki

(10) Patent No.: US 7,051,991 B2
(45) Date of Patent: May 30, 2006

(54) CONTROL VALVE

(75) Inventor: Isao Suzuki, Tokyo (JP)

(73) Assignee: MKS Japan, Inc., Tokyo (JP)

( * ) Notice: Subject to any disclaimer, the term of this patent is extended or adjusted under 35 U.S.C. 154(b) by 4 days.

(21) Appl. No.: 10/917,451

(22) Filed: Aug. 13, 2004

(65) Prior Publication Data
US 2005/0098748 A1    May 12, 2005

(30) Foreign Application Priority Data
Nov. 6, 2003    (JP)    ............................. 2003/376649

(51) Int. Cl.
*F16K 31/02* (2006.01)
(52) U.S. Cl. .................... 251/57; 215/129.17; 215/331
(58) Field of Classification Search ................... 251/57, 251/129.17, 331
See application file for complete search history.

(56) References Cited

U.S. PATENT DOCUMENTS

| | | | | |
|---|---|---|---|---|
| 3,558,099 A | * | 1/1971 | Giorgi et al. | 251/129.17 |
| 5,758,862 A | * | 6/1998 | Sturman | 251/25 |
| 5,772,181 A | * | 6/1998 | Robertson, III | 251/129.06 |
| 6,062,532 A | * | 5/2000 | Gurich et al. | 251/57 |
| 6,213,414 B1 | * | 4/2001 | Stier et al. | 239/584 |

* cited by examiner

*Primary Examiner*—Edward K. Look
*Assistant Examiner*—John K. Fristoe, Jr.
(74) *Attorney, Agent, or Firm*—Wenderoth, Lind & Ponack, L.L.P.

(57) ABSTRACT

An actuator operated by a solenoid and a force amplifying means utilizing hydraulic pressure are used in combination with a diaphragm, to thereby provide a diaphragm valve made of Teflon™, and which is compact in size, has low power consumption, and which is capable of exerting a large force. The force amplifying means mainly comprises a cylinder including cylinder portions having different cross-sectional areas and oil filled in the cylinder. A force amplification ratio is equal to a ratio between the cross-sectional areas of the cylinder portions. A plunger which receives a biasing force of a spring is provided on an upper side of the force amplifying means. The plunger is operated by a solenoid, and a driving force of the plunger is amplified by the force amplifying means and transmitted to the diaphragm, thus adjusting a degree of valve opening. A flow rate control valve of the present invention is free from the problems of conventional control valves, and used for controlling a flow rate of a fluid, such as a chemical liquid or an exceptionally high-purity liquid.

9 Claims, 6 Drawing Sheets

CONTROL VALVE

BACKGROUND OF THE INVENTION

The present invention relates to a proportional control valve capable of controlling a flow rate of a fluid to be at a desired level.

As a control valve for controlling a flow rate of a chemical liquid or an exceptionally high-purity liquid, it is preferable to use a valve made of Teflon™ so as to prevent entry of metal ions into the liquid. Further, to enable a flow rate of a chemical liquid to be precisely controlled, a diaphragm type valve is preferably used in which a degree of valve opening can be controlled as desired. A diaphragm made of Teflon™ is directly subject to a fluid pressure, and it is necessary to impart by way of an actuator a force that is sufficiently high to counteract this fluid pressure. Generally, as an actuator in this field of application, a linear actuator comprising a precision gear and a stepping motor is used (reference is made to, for example, U.S. Pat. No. 6,145,538).

However, use of a linear actuator of this type gives rise to various problems, such as high cost, difficulty in making fine adjustments due to gear backlash, low responsiveness, complexity of a control circuit, and so on.

SUMMARY OF THE INVENTION

It is an object of the present invention to provide a flow rate control valve which is free from the above-mentioned problems.

To achieve the stated object, in the present invention, an actuator operated by a solenoid and a force amplifying means utilizing hydraulic pressure are used in combination with a diaphragm, to thereby provide a diaphragm valve made of a fluoropolymer such as Teflon™, and which is compact in size, has low power consumption, and which is capable of exerting a large force.

Illustratively stated, the control valve of the present invention comprises a base made of a fluoropolymer such as Teflon™, and this base includes an inlet and an outlet for a fluid, a fluid flow path extending from the inlet to the outlet, and an orifice formed in a part of the fluid flow path. A valve seat is provided in the orifice. One surface of the diaphragm is adapted to abut against the valve seat to thereby close the orifice, thus forming a valve between the valve seat and the diaphragm.

A force amplifying means utilizing hydraulic pressure is provided, which abuts against the surface of the diaphragm on a side opposite to the valve seat. The force amplifying means includes a cylinder comprising cylinder portions having different cross-sectional areas. A fluid such as oil is filled in the cylinder to be accommodated in each of the cylinder portions. A first actuator member is displaceably fitted into a lower end portion of the cylinder, and a lower end of the first actuator member abuts against the surface of the diaphragm. A second actuator member is displaceably fitted into an upper end portion of the cylinder. Oil seals are used to seal the first and second actuator members relative to the cylinder. The second actuator member abuts against a plunger operated by a solenoid.

The plunger is operated by energizing the solenoid. A force of the plunger is transmitted to the second actuator member. The force which has been transmitted to the second actuator member is further transmitted and amplified through the oil accommodated in the cylinder, and is applied to the first actuator member. The first actuator member receives the amplified force and causes displacement of the diaphragm, to thereby control a degree of valve opening. A force amplification ratio increases in proportion to a ratio between the cross-sectional areas of the cylinder portions. A stroke length decreases in inverse proportion to the force amplification ratio.

To enable effective control of a flow rate of a chemical liquid, it is required to use a diaphragm made of Teflon™. However, a Teflon™ diaphragm is relatively hard. Therefore, a large force must be employed to displace such a diaphragm. Further, since the diaphragm is directly subject to a fluid under high pressure, it is necessary to employ a large operating force so as to counteract this fluid pressure. In the control valve of the present invention in which a force amplifying means is provided, the valve can be operated by amplifying a relatively low force of the plunger. Accordingly, it is made possible to obtain a high-force diaphragm valve while utilizing a simple and conventional valve structure. Thus, the control valve of the present invention is inexpensive since it has a simple structure. Further, fine adjustments can be conducted without any risk of gear backlash. In addition, the control valve of the present invention has high responsiveness and requires use of only a relatively simple control circuit.

When a Teflon™ diaphragm having an outer diameter of 13 mm is operated, a force of 30 N or more is required to be applied to the diaphragm relative to a fluid pressure of 3 $kg/cm^2G$, and an actuator stroke of 0.1 to 0.2 mm or more is required. Further, over time, a Teflon™ diaphragm is subject to creep deformation. Therefore, a maximum stroke of about 0.5 mm is preferable, from the viewpoint of compensating for such deformation. When a plunger is operated using a small solenoid, a force of 30 N can be generated with a power consumption of several W under attraction of the plunger to a magnetic pole of the solenoid. However, when the plunger becomes separated from the magnetic pole, the generated force is drastically reduced. Therefore, to generate a force of 30 N with a plunger stroke of 0.3 mm, a large solenoid and a power consumption as high as several ten W are required. This is not suitable for practical use.

However, as indicated in FIG. 1, in the control valve of the present invention, when a solenoid having a power consumption of 8 W, and capable of a stroke output of 1 mm and an output force slightly less than 20 N, is used in combination with a force amplifying means having a force amplification ratio of 4:1, a force of 80 N can be generated with a stroke of 0.25 mm, and a force of 60 N can be generated with a stroke of 0.5 mm.

DETAILED DESCRIPTION OF THE PREFERRED EMBODIMENTS

Figure 1:
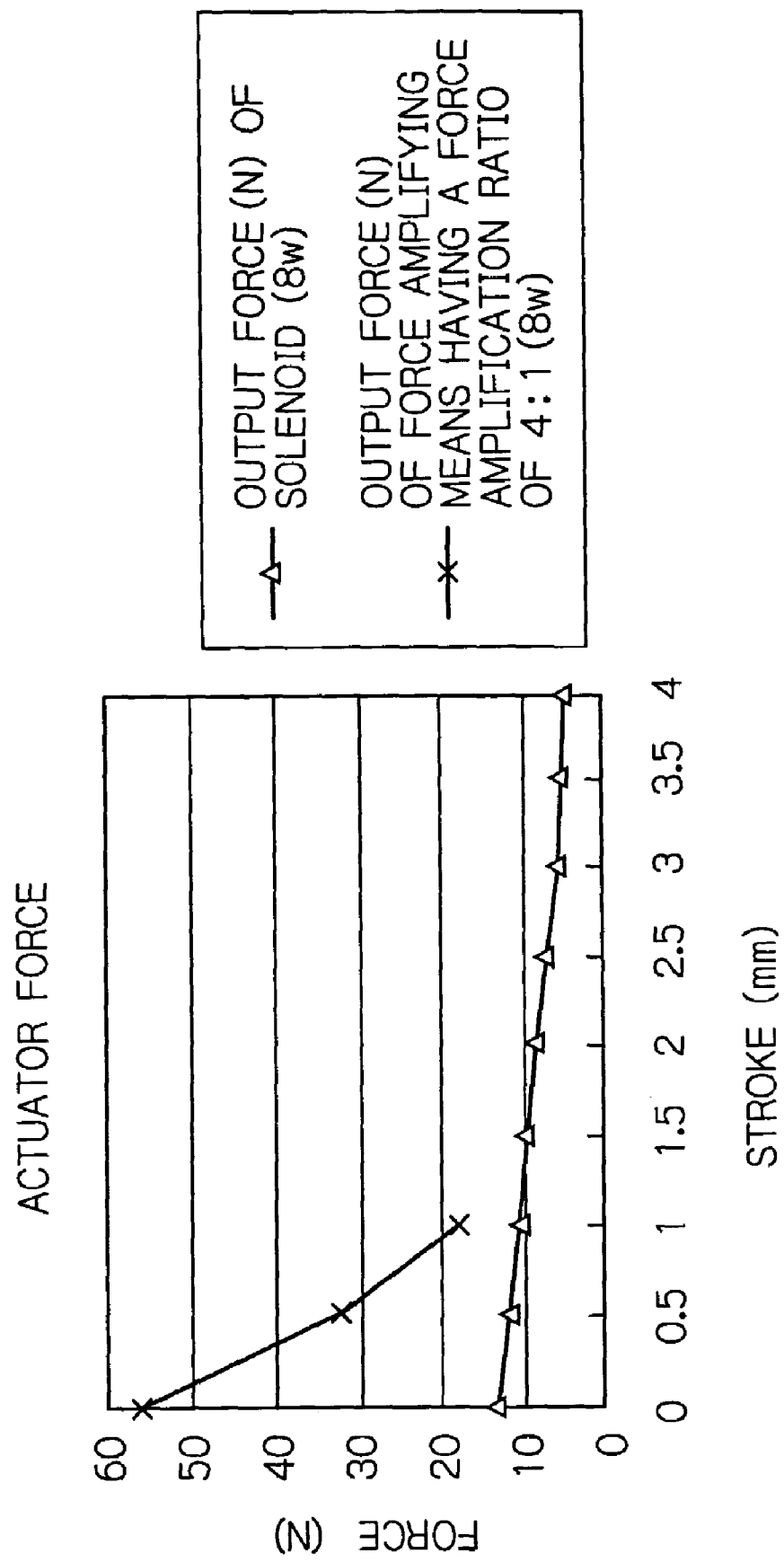
FIG. 1 is a graph indicating amplification of an actuator force by a force amplifying means in a control valve of the present invention.
Figure 2:
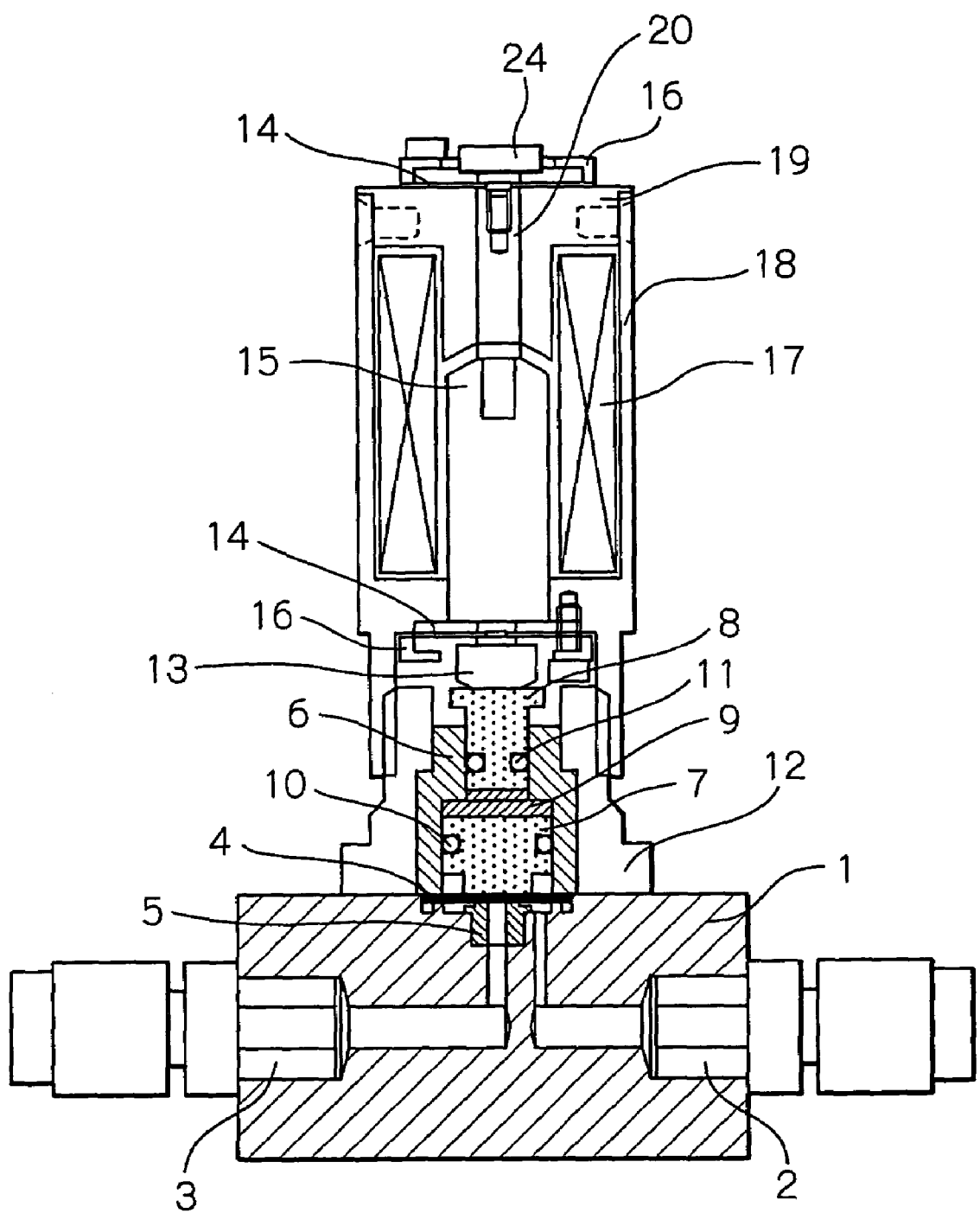
FIG. 2 is a cross-sectional view showing an entire construction of a control valve according to an embodiment of the present invention.

FIG. 2 shows an entire construction of a control valve for controlling a flow rate of a fluid according to an embodiment of the present invention, in which the valve is open when the solenoid is energized.

In the control valve shown in FIG. 2, a base 1 is made of a fluoropolymer such as Teflon™. The base 1 includes an inlet 2 and an outlet 3 for a fluid, and a fluid flow path extending from the inlet 2 to the outlet 3. An orifice is formed in a part of the fluid flow path. A valve seat 5 is provided in the orifice. A diaphragm 4 made of a fluoropolymer such as Teflon™ is disposed so as to close an opening of the valve seat 5. The diaphragm 4 acts as a valve head and, together with the valve seat 5, forms a fluid flow rate control valve. That is, the diaphragm 4 is displaced by a controlled amount, so as to form, between the diaphragm 4 and the valve seat 5, a fluid flow path corresponding to the amount of displacement, to thereby allow a fluid to flow at a desired rate through the fluid flow path.

Figure 3:
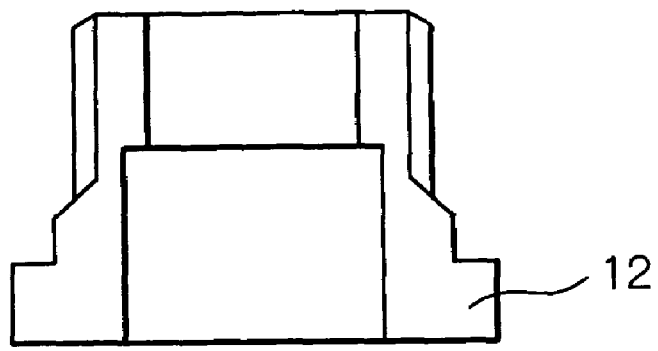
FIG. 3 is a cross-sectional view of a force amplifying means in the control valve according to the embodiment of the present invention.
Figure 3:
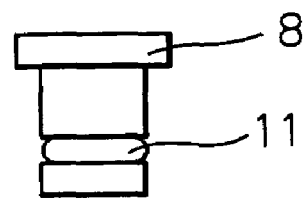
Figure 3:
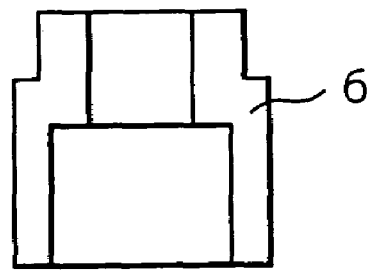
Figure 3:
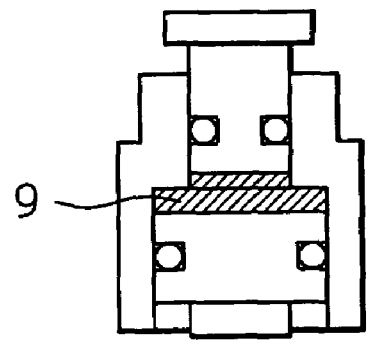
Figure 3:
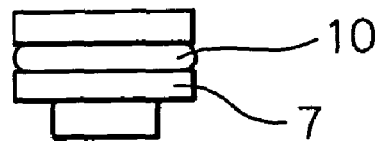

A force amplifying means which utilizes hydraulic pressure is provided on the diaphragm 4. The force amplifying means mainly comprises: a cylinder 6, including a first cylinder portion and a second cylinder portion, the first and second cylinder portions having different diameters; a first actuator member 7 and a second actuator member 8 slidably fitted into the two cylinder portions, respectively, and oil 9 filled in a space between the two actuator members. As is illustrated in detail in FIG. 3, the first actuator member 7 is fitted into the first cylinder portion having a large diameter. Subsequently, the oil 9 is supplied to the cylinder 6, and the second actuator member 8 is fitted into the second cylinder portion having a small diameter. A longitudinal dimension of the first actuator member 7 is determined so that the a fluid such as oil 9 supplied to the cylinder 6 is accommodated in each of the first cylinder portion having a large diameter and the second cylinder portion having a small diameter in an entire stroke range of an actuator. Oil seals 10 and 11 are attached to a longitudinally intermediate portion of the first actuator member 7 and a longitudinally intermediate portion of the second actuator member 8, respectively, so as to prevent leakage of oil. The cylinder 6 is enclosed within a cylinder housing 12. The cylinder housing 12 is fixed to the base 1.

Figure 4:
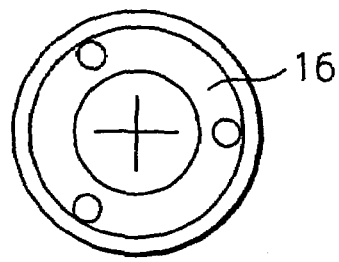
FIG. 4 is a plan view of a leaf spring and a spring retainer in the control valve of the present invention.
Figure 4:
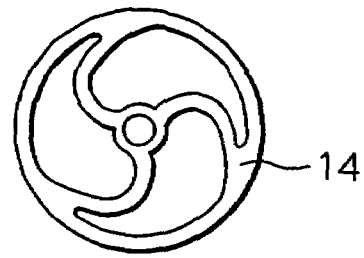

An abutment member 13 as a part of a plunger abuts against an upper surface of the second actuator member 8. The abutment member 13 is fixed to a plunger body 15 through a leaf spring 14. The plunger body 15 and the abutment member 13 act as a single unit, and constantly apply a downward pressure to the first actuator member 8 due to the action of a biasing force of the leaf spring 14. The leaf spring 14 is fixed by a spring retainer 16. FIG. 4 is a plan view of the leaf spring 14 and the spring retainer 16.

Figure 5:
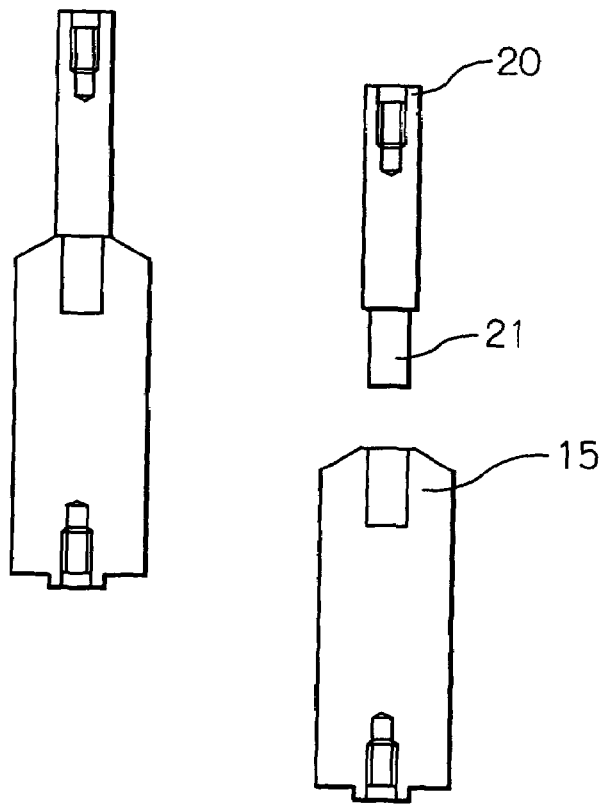
FIG. 5 is a cross-sectional view of a plunger member and a core rod in the control valve of the present invention.

The plunger body 15 is inserted into a solenoid coil 17 in such a manner as to allow longitudinal movement of the plunger body 15. When an electromagnetic force is generated by energizing the solenoid coil 17, the plunger body 15, together with the abutment member 13, is electromagnetically attracted against the biasing force of the leaf spring 14. The solenoid coil 17 is fittingly provided in a solenoid case 18 and fixed therein. A solenoid cap 19 is fixed to an upper end of the solenoid case 18 by means of screws. A core rod 20 is slidably fitted into a hole formed in the solenoid cap 19 along the center axis thereof. As shown in FIG. 5, the core rod 20 has a concentrically stepped portion forming a reduced-diameter distal end portion 21. The reduced-diameter distal end portion 21 is longitudinally press-fitted into a hole formed in an upper end portion of the plunger body 15, which hole has a form complementary to that of the reduced diameter distal end portion 21. A leaf spring 14 is fixed to an upper end of the solenoid cap 19 using a spring retainer 16. The leaf spring 14 and the spring retainer 16 are of the same type as those shown in FIG. 4. The core rod 20 is fixed to a central portion of the leaf spring 14 on the upper end of the solenoid cap 19, by means of a fixing screw 24. The core rod 20 extends through the solenoid cap 19 and the plunger body 15, to thereby conduct centering of the plunger body 15 and suppress axial deflection of the plunger 15 during axial movement thereof, thus ensuring smooth movement of the plunger body 15.

Next, explanation will be given with regard to an operation of this control valve. In the control valve in FIG. 2, when the solenoid coil 17 is deenergized, the abutment member 13 on the plunger body 15 presses the second actuator member 8 due to the action of a biasing force of the leaf spring 14. A force applied to the second actuator member 8 acts on the diaphragm 4 through the oil 9 and the first actuator member 7. Therefore, in a deenergized condition, the diaphragm 4 is pressed against the valve seat 5 to thereby close the fluid flow path. Thus, the control valve in this embodiment is of a type that is normally closed. When the solenoid coil 17 is energized, an electromagnetic force is generated and the plunger body 15 and the abutment member 13 are electromagnetically attracted in an upward direction against the biasing force of the leaf spring 14, to thereby open the valve. Thus, the valve is opened with a degree of opening corresponding to a power supplied to the solenoid coil 17, thereby controlling a flow rate of a fluid flowing through the valve.

Next, explanation will be given with regard to the principle of operation of the force amplifying means in the control valve of the present invention. As is described above, the cylinder 6 comprises a first cylinder portion having a large diameter and a second cylinder portion having a relatively small diameter, and the oil 9 is filled in the cylinder 6 so that the oil is accommodated in each of these two cylinder portions. A hydraulic pressure of the oil is uniform. Therefore, when utilizing a hydraulic pressure of the oil, a pressure acting on the second cylinder portion having a small diameter is uniformly transmitted throughout a large cross section of the first cylinder portion having a large diameter. Consequently, a force applied to the second actuator member is amplified at a force amplification ratio that is equal to a ratio between the cross-sectional areas of the cylinder portions of the cylinder 6. On the other hand, a stroke length decreases in inverse proportion to the force amplification ratio. Thus, a driving force of the plunger is amplified by the force amplifying means and transmitted to the diaphragm, to thereby adjust a degree of valve opening.

Figure 6:
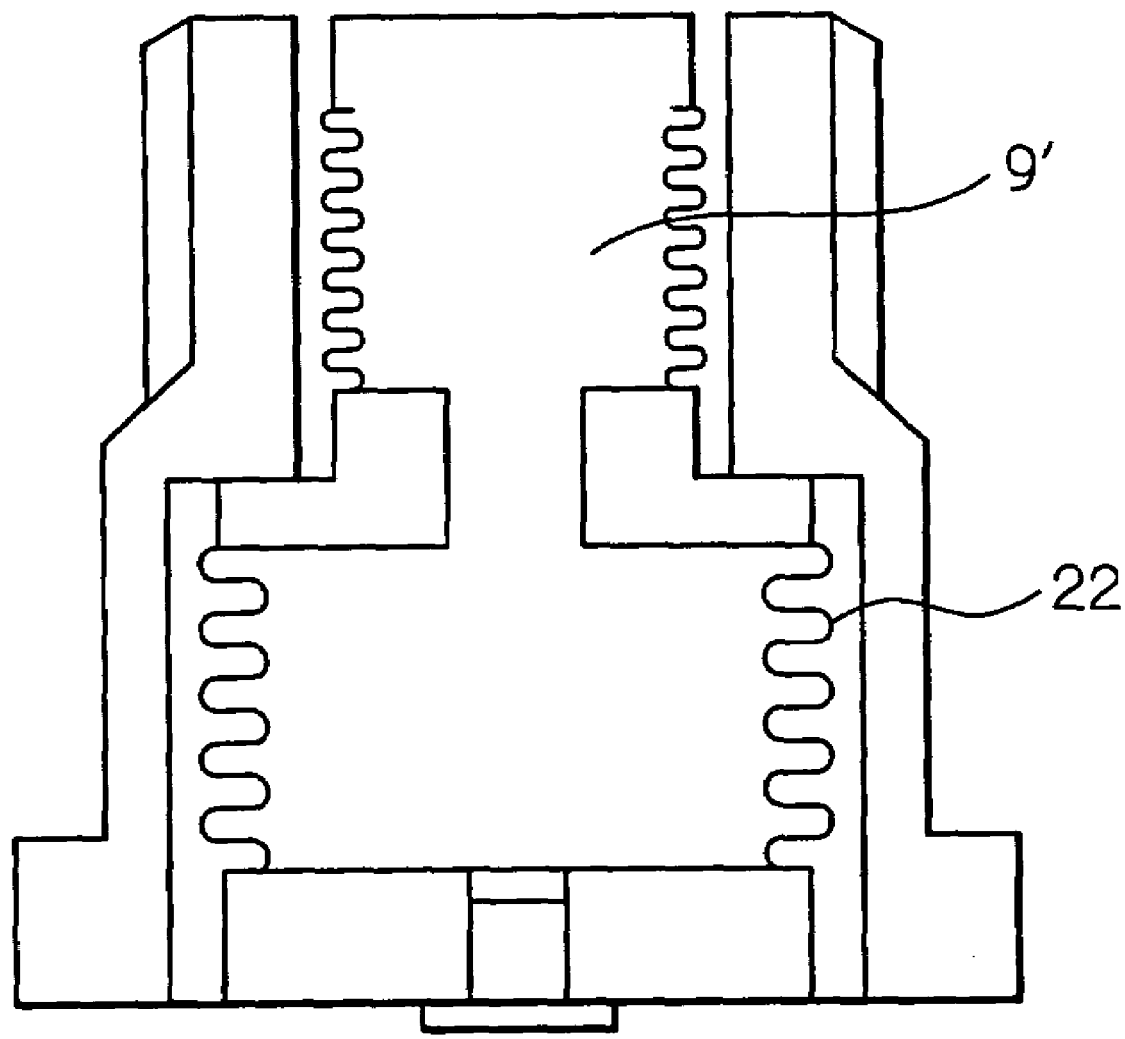
FIG. 6 is a cross-sectional view of a force amplifying means in a control valve according to another embodiment of the present invention.

FIG. 6 shows an embodiment in which a bellows 22 having a sealed interior filled with silicone oil 9' is used as the force amplifying means. This embodiment achieves a higher degree of responsiveness as compared to the force amplifying means shown in FIG. 3.

Figure 7:
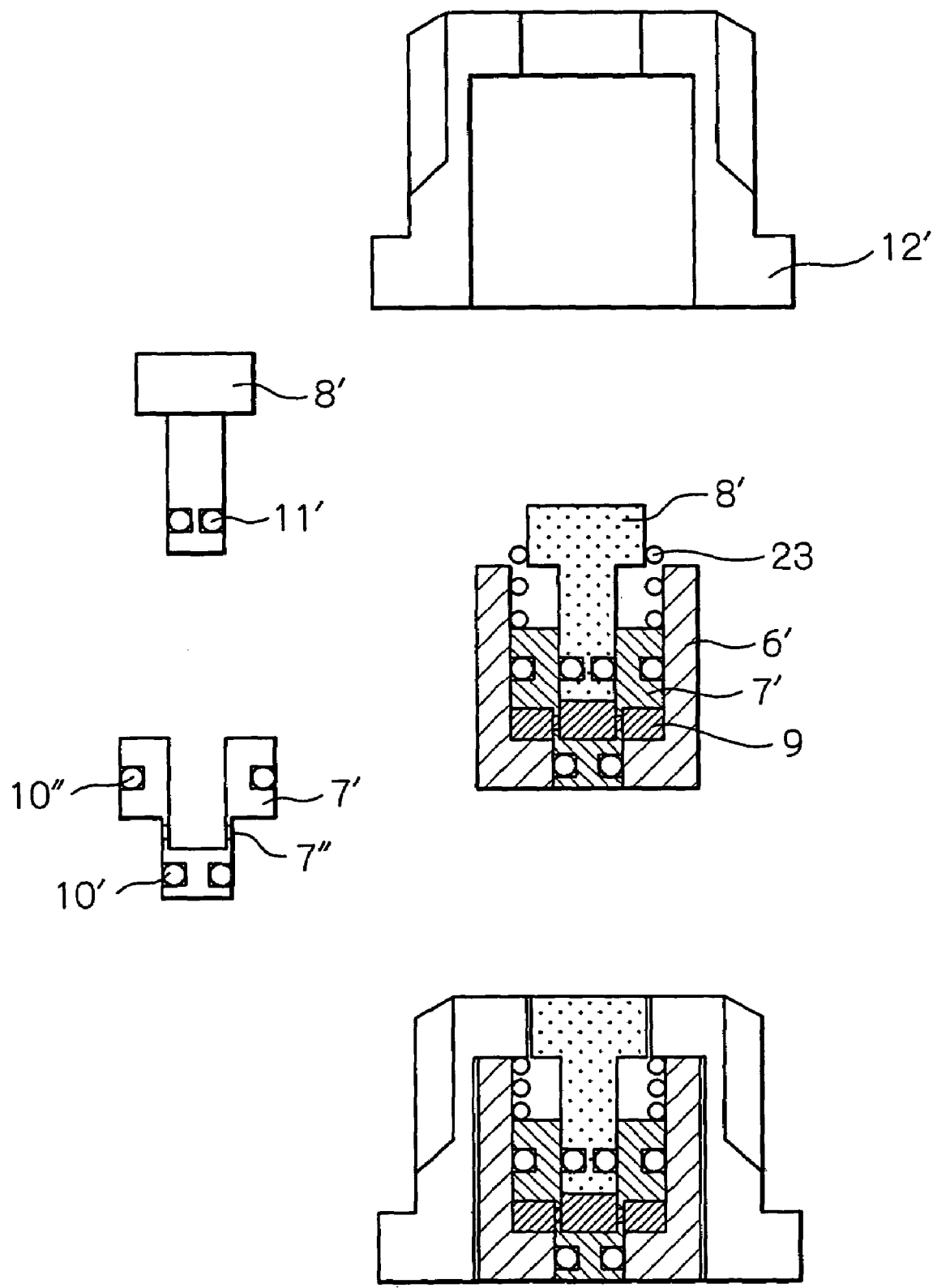
FIG. 7 is a cross-sectional view of a force amplifying means in a control valve according to a further embodiment of the present invention.

FIG. 7 shows an embodiment in which the first actuator member and the second actuator member are moved in opposite directions, and the valve is adapted to be closed when the plunger body 15 is moved upward. In this embodiment, as shown in FIG. 7, a second actuator member 8' is fitted into a first actuator member 7'. As in the embodiment shown in FIG. 2, oil seals 10' and 10", and 11' are attached to the first actuator member 7' and the second actuator member 8', respectively, so as to prevent leakage of oil. Further, as in the embodiment of FIG. 2, oil 9 is filled in a space between the first actuator member 7' and the second actuator member 8'. The first actuator member 7' includes an opening 7" through which the oil moves toward a cylinder 6'. The first actuator member 7' and the second actuator member 8' are fitted into the cylinder 6', and a coil spring 23 is attached to an upper surface of the first actuator member 7'. Further, the cylinder 61, in which the first actuator member 7', the second actuator member 8' and the coil spring 23 are provided, is assembled to a cylinder housing 12'. An assembly thus obtained is fixed to the base 1 as in the embodiment of FIG. 2. The other arrangements are the same as those in the embodiment of FIG. 2. When the solenoid coil 17 is energized, the plunger body 15 is attracted in an upward direction against the biasing force of the leaf spring 14. Under the upward movement of the plunger body 15, the second actuator member 8' is moved upward, and a force acting on the first actuator member 7' decreases by an amount corresponding to a force which has been produced by amplification according to a ratio between cross-sectional areas of oil-filled portions. As a result, the first actuator member 7' is moved downward due to the action of a biasing force of the coil spring 23, thus displacing the diaphragm 4 and closing the control valve.

As has been described above, the present invention is especially advantageous for use in controlling a flow rate of a chemical liquid and a high-purity liquid. Needless to say, however, the present invention can be applied to the control of flow rates of various fluids.

What is claimed is:

1. A proportional control valve for controlling a flow rate of a fluid to be at a desired level, said proportional control valve comprising:
    a base including an inlet and an outlet for a fluid, a fluid flow path extending from the inlet to the outlet and an orifice formed in a part of the fluid flow path,
    a valve seat provided in the orifice;
    a diaphragm acting as a valve head relative to said valve seat with one surface thereof being adapted to abut against said valve seat;
    first and second actuator members being operable by a solenoid to thereby cause displacement of said diaphragm,
    said first actuating member being adapted to abut against a surface of said diaphragm on a side opposite to said valve seat,
    said first actuator member comprising a hollow cylindrical body having one open end;
    said second actuator member comprising a solid cylindrical body which is fitted into a hollow portion of said first actuator member; and
    a cylinder having cylinder portions of different cross-sectional areas, said cylinder being sealed with said first and second actuator members which are displaceably fitted in opposite ends of said cylinder,
    a fluid filled in a space between said first actuator member and said second actuator member,
    said first actuator member and said second actuator member being adapted to move in opposite directions such that when said first actuator member is pressed downward, said second actuator member is pressed upward by means of the fluid.

2. A proportional control valve according to claim 1, further comprising: a cylinder housing, said cylinder being received in said cylinder housing; and a coil spring disposed between a surface of said cylinder housing and a surface of said first actuator member so as to bias said first actuator member in a direction toward said diaphragm.

3. A proportional control valve according to claim 2, wherein, when a force is applied to said second actuator member by means of said solenoid, said second actuator member moves in one direction, thus allowing said first actuator member to displace said diaphragm with an amplified force.

4. A proportional control valve according to claim 3, wherein said first actuator member includes an opening through which the fluid can move toward or away from an inner peripheral surface of said cylinder.

5. A proportional control valve according to claim 4, wherein said solenoid is operable to move the second actuator member is an upward direction which reduces a force acting on said first actuator member by an amount corresponding to a force produced by amplification due to a ratio between cross-sectional areas of fluid-filled portions between said first and second actuator members, thereby permitting the first actuator member to move downward under the biasing force of the coil spring.

6. A proportional control valve according to claim 2, wherein at least part of said diaphragm is made of polytetrafluoroethylene.

7. A proportional control valve according to claim 1, wherein at least part of said diaphragm is formed of a fluoropolymer.

8. A proportional control valve according to claim 1, wherein at least part of said diaphragm is made of polytetrafluoroethylene.

9. A proportional control valve according to claim 1, wherein the fluid in said cylinder is oil.

* * * * *